June 14, 1949.  C. R. KILMER  2,473,338
VEHICLE SPRING PRELOADING DEVICE
Filed Dec. 26, 1947
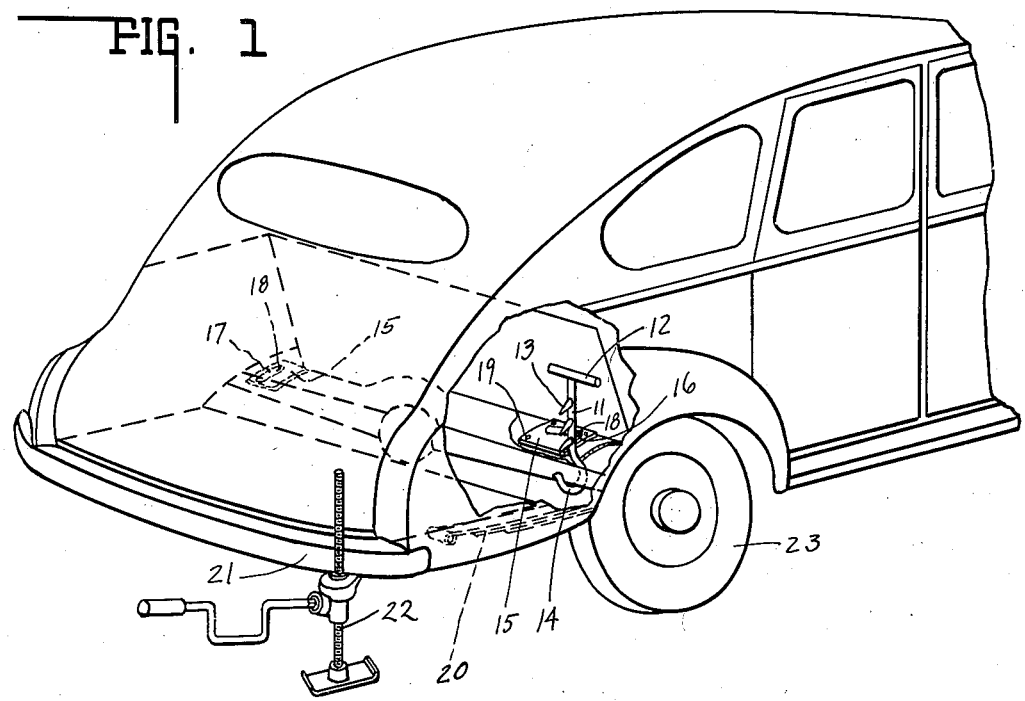
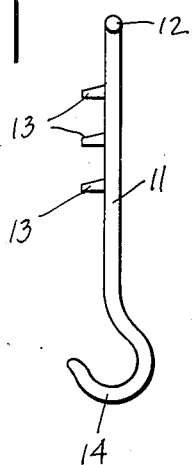
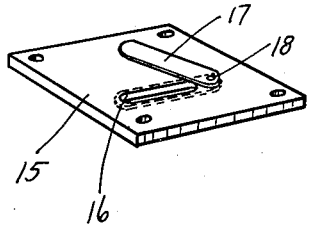
INVENTOR.
CLYDE R. KILMER.
BY
Lockwood, Goldsmith & Galt
ATTORNEYS.

Patented June 14, 1949

2,473,338

UNITED STATES PATENT OFFICE 2,473,338

VEHICLE SPRING PRELOADING DEVICE

Clyde R. Kilmer, Elkhart, Ind.

Application December 26, 1947, Serial No. 793,994

2 Claims. (Cl. 267—2)

This invention relates to vehicle spring preloading devices.

The chief object of the present invention is to eliminate the necessity of a bumper jack excessively elevating a chassis for tire change purposes with the possibility of jack slipping so that the present invention seeks to preload a normally extensible chassis spring when the chassis or bumper is elevated for tire exchange purposes and the like.

The chief feature of the present invention resides in a slotted bearing plate operatively supported by the frame in combination with a catch member including a shank having a plurality of locking lugs for selective association with said plate; said shank also having a handle at one end and a hook portion at the other end, the latter being adapted for vehicle axle or similar part engagement.

The full nature of the invention will be understood from the accompanying drawings and the following description and claims:

In the drawings:

Figure 1 is a perspective view of a portion of a vehicle with the invention applied thereto, parts being broken away to show other parts in greater detail.

Figure 2 is a side view of the catch member.

Figure 3 is a perspective view of the slotted bearing plate.

In Figures 1 and 3, 15 indicates a slotted bearing plate. The catch member, see Figures 1 and 2, includes an elongated shank 11 having a plurality of projecting locking lugs 13 for selective association with bearing plate 15, and also having a handle 12 at one end and a hook portion 14 at the other end, the latter being adapted for vehicle axle or other part engagement. The locking lugs are spaced apart and longitudinally disposed upon the shank.

In Fig. 1, 19 indicates four bolts for securing said plate 15 to the car body. In bearing plate 15 there is a slot 16 of a width and length slightly greater than the width and length of the shank and lugs. A metal cover 17 is secured to said plate by bolt 18 which allows the cover to swing over the slot 16 to prevent dust and dirt from entering into the car when the vehicle spring pre-loading device is not in use.

In operating the vehicle spring pre-loading device, the hook portion 14 is inserted through slot 16 with locking lugs 13 on the opposite portion of shank 11 in relation to the axle or part to be engaged. The hook portion 14 is lowered by handle 12 to a position below the axle or part to be engaged and then the handle 12 is turned 180° thus placing the hook portion 14 in a position for subsequent axle engagement. The handle 12 is pulled up until the hook portion 14 engages the axle, etc., and the selected locking lug 13 is disposed above the bearing plate 15 and in position to bear thereon. Bumper jack 22 is then actuated raising the bumper 21. This locks the catch member to the plate 15 and axle, and continued jack operation then effects elevation of the chassis and the wheel 23 due to the pre-loading of the vehicle spring 20.

The invention as illustrated in the drawings is applicable to the front wheels as well as the rear wheels.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention reference being had to the appended claims.

The invention claimed is:

1. A device for pre-loading a load spring structure of a self-propelled vehicle, comprising in combination a slotted bearing plate operatively supported by the frame and a catch member having a shank including a handle at one end and a hook portion at the other end, the latter being adapted for axle or similar part engagement, and a plurality of longitudinally spaced locking lugs on said shank selectively associated with the said plate, the hook extending through the plate and the slot being of such length that it will pass the hook portion and any and all of the said lugs, the lugs being disposed transversely of the longitudinal direction of the slot and one of the lugs bearing on the plate when in operative position for spring preloading purposes.

2. A device for pre-loading a load spring structure of a self-propelled vehicle, comprising in combination a slotted bearing plate operatively supported by the frame and a catch member having a shank including a handle at one end and a hook portion at the other end, the latter being adapted for axle or similar part engagement, and a plurality of longitudinally spaced locking lugs on said shank selectively associated with the said plate, the hook extending through the plate and the slot being of such length that it will pass the hook portion and any and all of the said lugs, the lugs being disposed transversely of the longitudinal direction of the slot and one of the lugs bearing on the plate when in operative position for spring pre-loading purposes, and a movable cover for the slot in the bearing plate for covering the slot when pre-loading device is not in use.

CLYDE R. KILMER.

REFERENCES CITED

The following references are of record in the file of this patent:

UNITED STATES PATENTS

| Number | Name | Date |
| --- | --- | --- |
| 1,667,362 | Van Der Vliet | Apr. 24, 1928 |
| 2,247,009 | Averill | June 24, 1941 |
| 2,413,290 | Carter | Dec. 31, 1946 |
| 2,459,989 | Bobek et al. | Jan. 25, 1949 |